United States Patent [19]

Noguchi et al.

[11] Patent Number: 4,758,903
[45] Date of Patent: Jul. 19, 1988

[54] APPARATUS FOR RECORDING AND REPRODUCING VIDEO SIGNAL AND DIGITAL SIGNAL OTHER THAN VIDEO SIGNAL

[75] Inventors: Takaharu Noguchi, Yokohama; Hiroyuki Kimura, Kanagawa; Masaharu Kobayashi, Yokohama; Yasufumi Yunde, Yokohama; Takao Arai, Yokohama; Nobutaka Amada, Yokohama; Kuniaki Miura, Ibaraki, all of Japan

[73] Assignee: Hitachi, Ltd., Tokyo, Japan

[21] Appl. No.: 800,147

[22] Filed: Nov. 20, 1985

[30] Foreign Application Priority Data

Nov. 22, 1984 [JP] Japan ................................ 59-245936
Jun. 21, 1985 [JP] Japan ................................ 60-134058
Jun. 21, 1985 [JP] Japan ................................ 60-134059
Jun. 21, 1985 [JP] Japan ................................ 60-134060

[51] Int. Cl.⁴ .......................................... H04N 5/782
[52] U.S. Cl. .................................... 360/19.1; 360/30; 360/21; 360/65; 358/343; 358/330
[58] Field of Search .................... 360/19.1, 30, 32, 21, 360/33.1, 65, 20; 358/343, 330, 310, 335

[56] References Cited

U.S. PATENT DOCUMENTS 3,893,168  7/1975  Bechly ................................. 360/30
4,353,098 10/1982  Heing ................................. 360/33.1
4,490,751 12/1984  Kono ................................. 358/343
4,527,203  7/1985  Komai ................................. 360/19.1
4,564,868  1/1986  Arafune ................................. 360/19.1
4,613,912  9/1986  Shibata ................................. 360/19.1

OTHER PUBLICATIONS

"Development of HiFi VHS VTA System", by Muira et al., Report of Soc. for Study of Mag. Recording in Institute of Electronic & Communications Engineers of Japan, No. MA.
"Activity of DAT Conference", by Iwashita, Electron, vol. 24, No. 10, pp. 36–42, Oct. 1, 1984.
"Chapter 7 Reproduction Process, 7.5 Reproducing of Digital Signals", by Matsumoto, Magnetic Recording, pp. 124–133, Nov. 30, 1977.
"An Analysis of the Recording Characteristics in Short Wavelength", by Muramatsu, Report of Society for Study of Magnetic, Recording in Institute of Electronics & Communications Engineers of Japan, No. MR75-28, Jan. 1976.

*Primary Examiner*—Alan Faber
*Attorney, Agent, or Firm*—Antonelli, Terry & Wands

[57] ABSTRACT

In a recording and reproducing apparatus wherein a video signal and an audio signal are recorded on the same recording track, a signal subjected to a quadrature differential PSK modulation with PCM audio signal is generated as an audio recording signal. The audio recording signal is disposed between occupied bands of FM luminance signal and down converted chrominance signal in a video recording signal and also recorded on a track where the video recording signal is to be recorded.

12 Claims, 18 Drawing Sheets

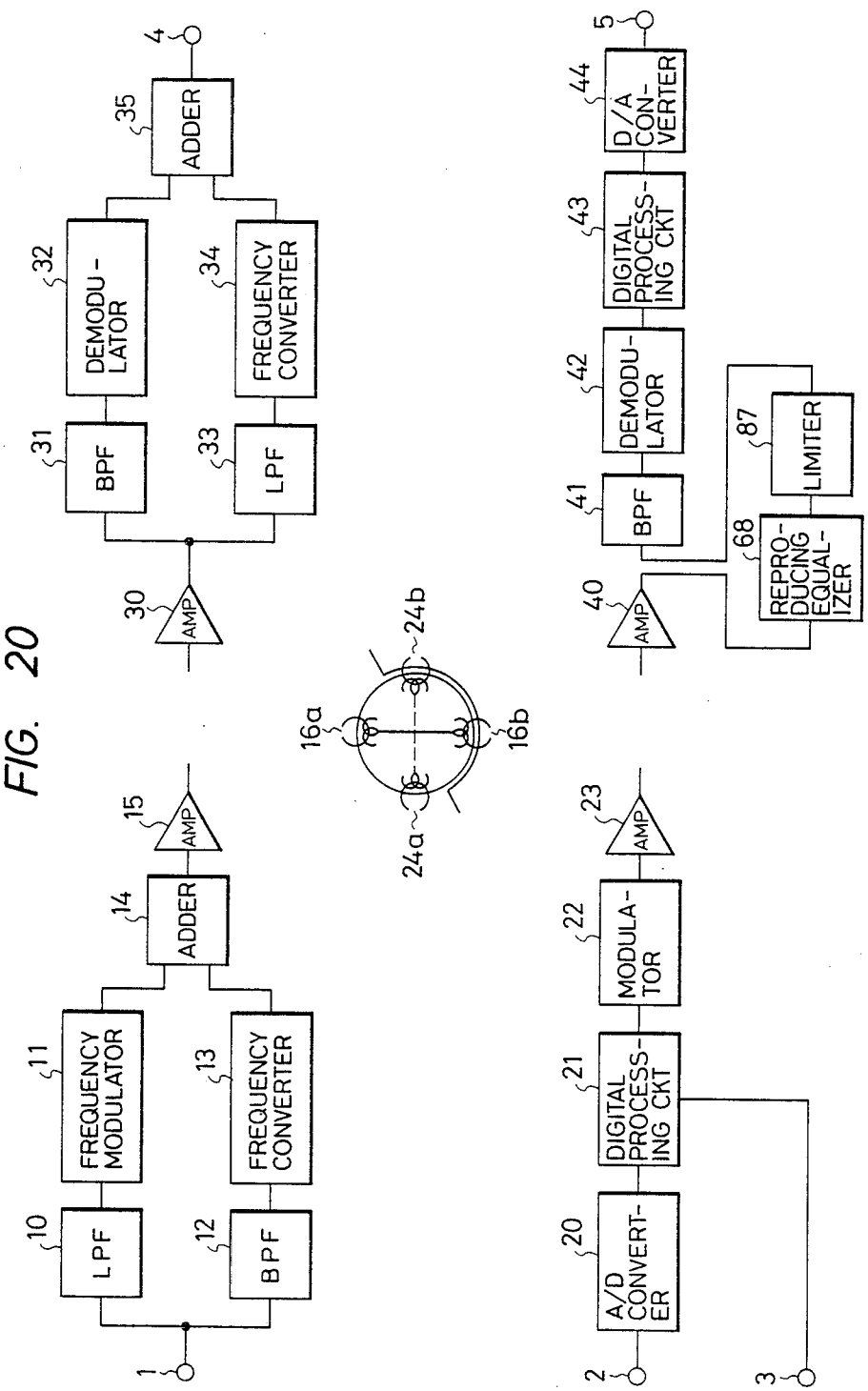

APPARATUS FOR RECORDING AND REPRODUCING VIDEO SIGNAL AND DIGITAL SIGNAL OTHER THAN VIDEO SIGNAL

BACKGROUND OF THE INVENTION

This invention relates to an apparatus for recording and reproducing signals, and is particularly concerned with a recording and reproducing apparatus suitable for recording PCM audio signals or other digital signals in multiplex on video signals.

As described in a report titled "HiFi VHS VTR System" by Kuniaki Miura and 5 others in MR83-20 (1983), Institute of Electronics and Communication Engineers of Japan, a system for superposing a frequency modulated audio signal on a video signal track for recording video signals by means of a rotary audio head for exclusive use on recording audio signals is employed hitherto as a recording method for audio signals of a home video tape recorder (hereinafter called VTR) which is intended for tone quality enhancement. However, the requirement today is such that a VTR must be digitized for further high quality recording in accordance with a spread of a digital audio disc player using a compact disc and a commencement of high quality digital audio broadcasting on satellite.

SUMMARY OF THE INVENTION

In compliance with such requirement, an object of the invention is to provide a recording and reproducing apparatus capable of recording digital signals in a home VTR in such manner as will not cause a mutual disturbance with video signals.

The above object can be attained by the invention providing a recording and reproducing apparatus wherein a video signal and an information signal other than the video signal like an audio signal are recorded on the same recording track on a recording medium, which comprises:

first processing means for converting the video signal to be recorded into a video recording signal having a predetermined frequency band;

second processing means for converting the information signal to be recorded other than the video signal into a digital signal;

a modulator for modulating a carrier wave with the digitized information signal so that a frequency band of a signal modulated with the digitized information signal will be disposed outside an occupied band of the video recording signal or between occupied bands of a luminance signal component and a chrominance signal component of the video recording signal; and transducer means for recording the video recording signal and an output signal of the modulator on the same recording track.

BRIEF DESCRIPTION OF THE DRAWINGS

In the accompanying drawings:

FIG. 20 is a block diagram representing a fifth embodiment of this invention;

DETAILED DESCRIPTION OF PREFERRED EMBODIMENTS

Figure 1:
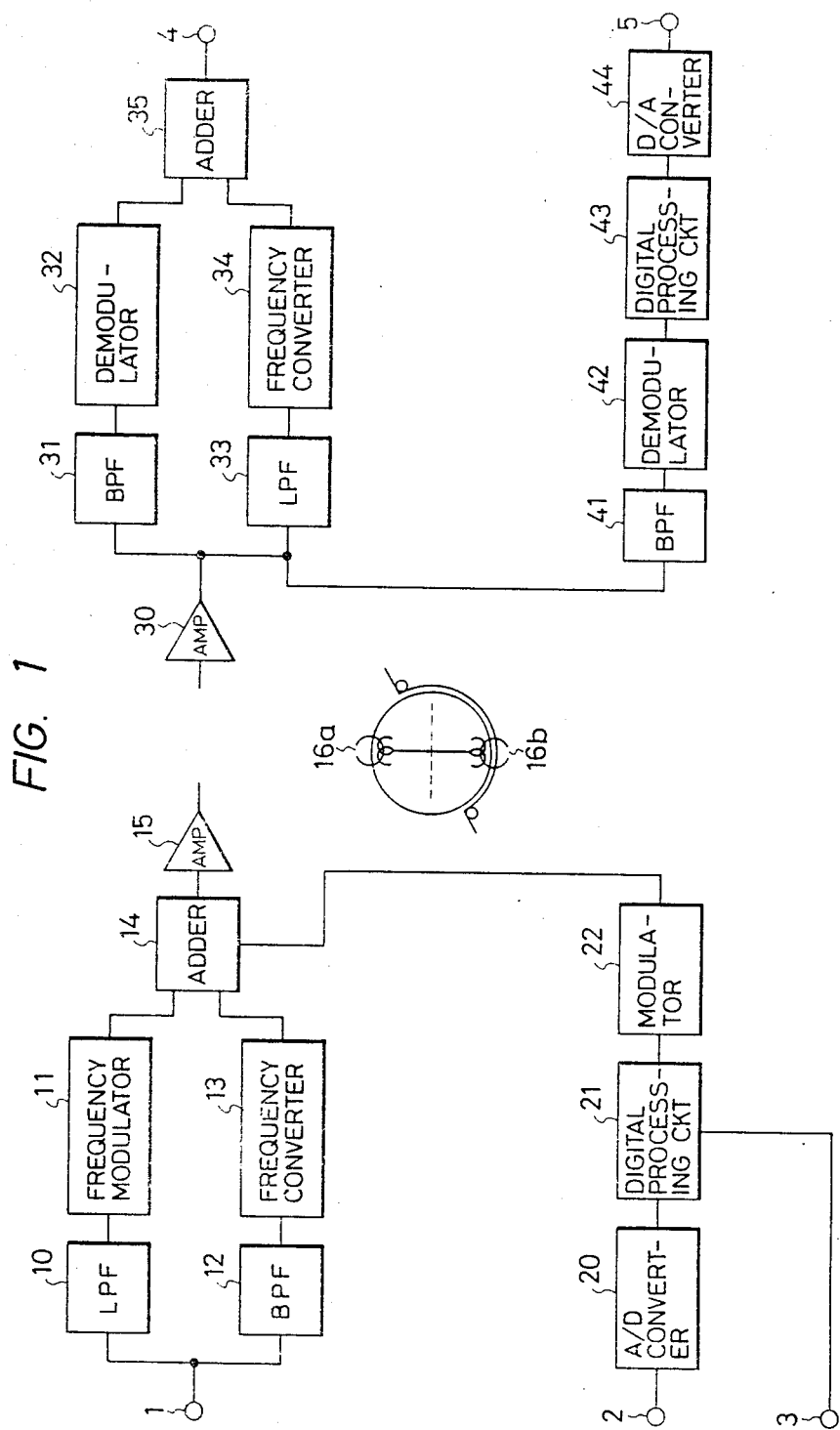
FIG. 1 is a block diagram representing a first embodiment of this invention.

One embodiment of this invention will be described with reference to FIG. 1. In the drawing, 1 denotes a video signal input terminal, 10 denotes a low pass filter (hereinafter called LPF) for separating a luminance signal, 11 denotes a modulator for subjecting a carrier wave to frequency modulation with the luminance signal, 12 denotes a band pass filter (hereinafter called BPF) for separating a chrominance signal, 13 denotes a frequency converter for converting the chrominance signal into a low frequency band, 14 denotes an adder for combining a signal subjected to frequency modulation with the luminance signal, a down converted chrominance signal, and a signal modulated with an audio signal, 15 denotes a recording amplifier, 16a, 16b denote recording and reproducing heads, 2 denotes an audio signal input terminal, 20 denotes an analog-to-digital converter (hereinafter called A/D converter), 21 denotes a digital processing circuit, 22 denotes a modulator, 30 denotes a reproducing amplifier, 31 denotes BPF for separating a luminance signal component, 32 denotes a demodulator for wave subjected to frequency modulation, 33 denotes LPF for separating a chrominance signal component, 34 denotes a frequency converter, 35 denotes an adder for combining a luminance signal and a chrominance signal, 4 denotes a video signal output terminal, 41 denotes BPF for separating an audio signal component, 42 denotes a demodulator, 43 denotes a digital processing circuit, 44 denotes a digital-to-analog converter (hereinafter called D/A converter), and 5 denotes an audio signal output terminal.

Figure 2:
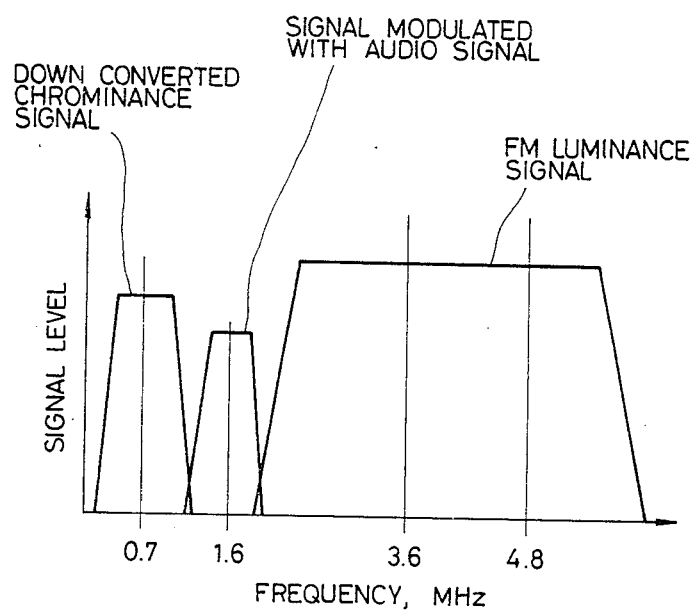
FIG. 2 is a drawing representing one example of a spectrum of recording signals.

An operation will be then described. A video signal is separated into a luminance signal and a chrominance signal through LPF 10 and BPF 12. A signal subjected to frequency modulation with the luminance signal is generated in the frequency modulator 11. The signal is called "FM luminance signal" hereinafter. The chrominance signal is then converted into a low frequency band. Frequency bands of these signals are shown in FIG. 2. The video recording signal consisting of FM luminance signal and a down converted chrominance signal is multiplexed through a frequency-division multiplex with an audio recording signal described hereinafter. The multiplexed video and audio recording signals are recorded on a magnetic tape by two opposite video recording heads 16a, 16b. A luminance signal component and a chrominance signal component are separated by BPF and LPF from the signals reproduced by video heads 16a, 16b at the time of reproducing, returned to an original video frequency band by the frequency-modulated wave demodulator 32 and the frequency converter 34 respectively, and then restored to a video signal on the adder 35.

On the other hand, an audio signal is converted into a digital signal through A/D converter 20, added with a synchronizing signal and an error correcting code through the digital processing circuit 21, applied with interleave, and then inputted to the modulator 22. In the modulator 22, a carrier wave is modulated with the digital signal (an output of the processing circuit 21) so that the frequency of a signal modulated with the digital signal will be disposed outside occupied bands of the down converted chrominance signal and FM luminance signal or disposed between the occupied bands of both the two in a recording signal spectrum shown in FIG. 2. The modulated wave, that is the audio recording signal, is multiplexed with the video recording signal through frequency-division multiplex and then recorded on a video track.

An audio signal component is extracted from signals reproduced on the video heads 16a, 16b through BPF 41 at the time of reproducing, demodulated then to an original digital signal through the demodulator 42 and the digital processing circuit 43, and an original analog audio signal through D/A converter.

A higher quality aural transmission can be realized without being influenced by a distortion of the recording medium from recording the audio signal thus in the form of digital signal, or pulse code modulated signal.

Figure 3:
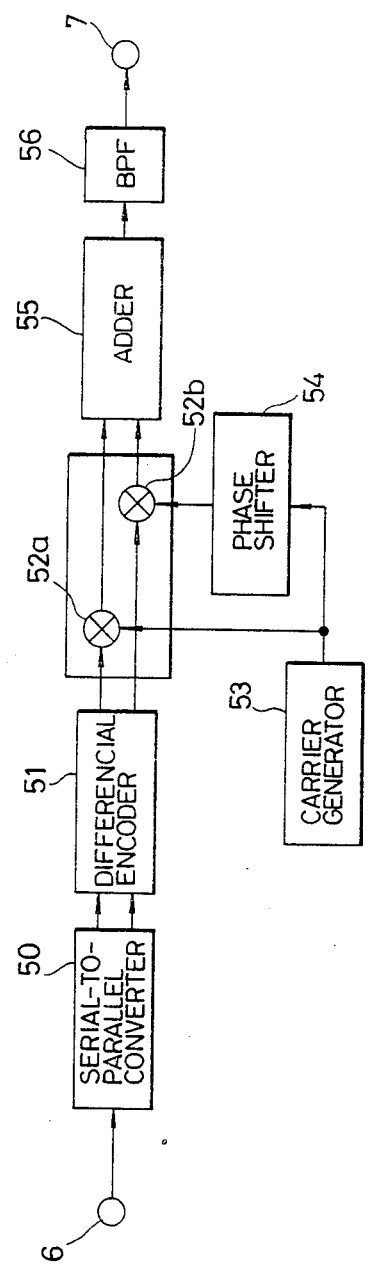
FIG. 3 is a block diagram representing a quadrature differential phase-shift keying modulator.
Figure 4:
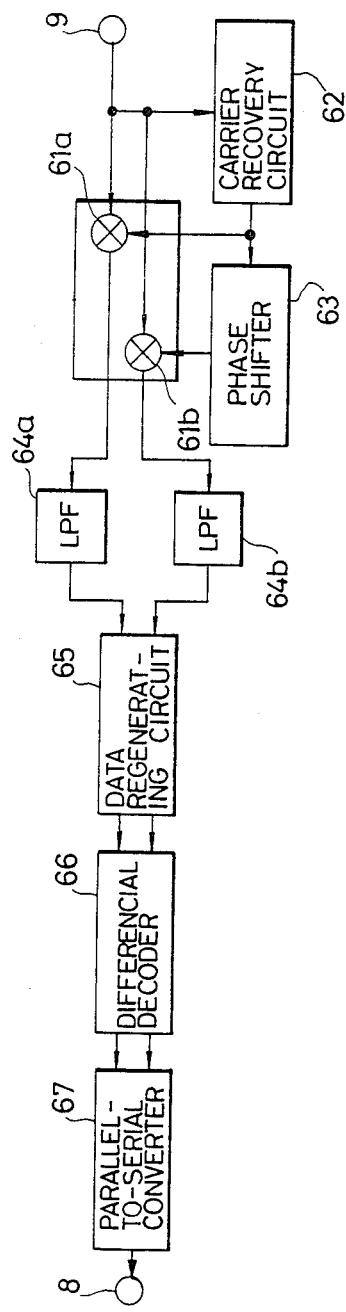
FIG. 4 is a block diagram representing a quadrature differential phase-shift keying demodulator.

Here, a quadrature differential phase-shift keying method ("phase-shift keying" being abbreviated as "PSK" hereinafter) may be taken up as one example of the method for modulating a carrier wave with the pulse code modulated audio signal (hereinafter called PCM audio signal) into a narrow signal band. A configuration of the modulator 22 and the demodulator 42 for practicing this method is shown in FIG. 3 and FIG. 4. In FIG. 3, 50 denotes a serial-to-parallel converter of the digital signal, 51 denotes a differential encoder, 52a and 52b denote balanced modulators, 53 denotes a carrier generator, 54 denotes a 90° phase shifter, 55 denotes an adder, and 56 denotes BPF. Then, in FIG. 4, 61a and 61b denote coherent detectors, 62 denotes a carrier recovery circuit, 63 denotes a 90° phase shifter, 64a and 64b denote LPF's, 65 denotes a data regenerating circuit, 66 denotes a differential decoder, and 67 denotes a parallel-to-serial converter for converting a demodulated parallel data into a serial data.

An operation of the modulator 22 will be described. PCM audio signal output from the digital processing circuit 21 is given to a terminal 6. The PCM audio signal is displaced by a parallel data in 2 bits through the serial-to-parallel converter 50. The signal is subjected to a differential conversion through the differential encoder 51. Phase shifts 0°, 90°, 180° and 270° are assigned to 2-bit values 00, 01, 11 and 10 of the converted signal. The signal is inputted to the balanced modulators 52a and 52b to which an output of the carrier generator 53 having a stable oscillation source such as crystal or the like is supplied as a carrier signal. Phases of the carrier signals supplied each to the two modulators 52a and 52b are different at 90° from each other. A quadrature differential PSK signal is generated by adding outputs of the two balanced modulators on the adder 55. The PSK signal has its band limited by BPF 56 and is then outputted from a modulator output terminal 7.

The demodulator 42 reproduces an original serial data from the quadrature differential PSK signal at the time of reproducing. First, the quadrature differential PSK signal is given to an input terminal 9.

The quadrature differential PSK signal is supplied to the carrier recovery circuit 62 and the coherent detectors 61a and 61b. The carrier signal is regenerated through the carrier recovery circuit 62, and the signal and a signal with the phase shifted 90° are inputted to the coherent detectors 61a and 61b respectively. Each output of the coherent detectors 61a and 61b is demodulated to a 2-bit data through LPF 64a and 64b and the data regenerating circuit 65. The signal is inputted to the differential decoder 66 operating for inverse conversion to the differential encoder 51 and thus decoded. The 2-bit data after decoding is inputted to the parallel-to-serial converter 67 to regenerate an original serial signal and is then outputted from a demodulator output terminal 8.

As described above, the PCM audio signal is subjected to quadrature differential PSK modulation and disposed in a gap between spectra of the chrominance signal and the luminance signal to a multiplex recording, thereby providing a recording and reproducing apparatus of the high quality audio signal in a home VTR.

Figure 5:
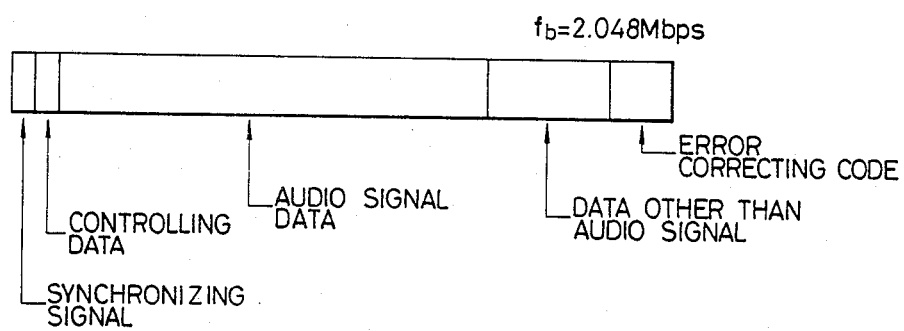
FIG. 5 is a drawing representing a configuration of a digital data to be recorded.

Then in FIG. 1, the audio signal is converted into a digital signal through A/D converter 20 and inputted to the digital processing circuit 21. However, in the case of digital information such as sound already digitized or facsimile, it is conceivable that it may be inputted directly to the digital processing circuit 21 from an input terminal 3 to a digital recording. One example of the digital data is shown in FIG. 5. The data comes in a synchronizing signal at the head, next a controlling data, an audio signal data, and a data other than audio signal in that order. An error correcting code is added finally. The data represents a 12 GHZ band satellite broadcasting PCM audio format. A transmission bit rate of the signal is 2.048 Mbps, and its band becomes about 1 MHz after quadrature differential PSK modulation.

Now, therefore, if the carrier frequency is selected, for example, at 1.6 MHz or so, a spectrum band of the audio signal at the time of recording on a tape becomes 1.1 to 2.1 MHz. Consequently, PCM sound can be recorded and reproduced with less interference with a luminance signal and a chrominance signal of the video signal.

As a format processed and generated in the digital signal processing circuit 21, for example, a configuration of PCM area of DAT format in a rotary head system which is mentioned in "Activity of DAT Conference" by Ryuji Iwashita in "ELECTRON", Vol. 24, No. 10 (1984) can be employed as another embodiment. In this case, a transmission bit rate of the recording signal is about 2.6 Mbps, and the band will be about 1.3 MHz after quadrature differential PSK modulation.

Accordingly, if the carrier frequency is selected, for example, at 2 MHz or so, then a frequency spectrum band of the audio signal at the time of recording on a tape becomes 1.35 to 2.65 MHz. Consequently, the audio signal can be recorded and reproduced with less interference with a luminance signal and a chrominance signal of the video signal.

Figure 6:
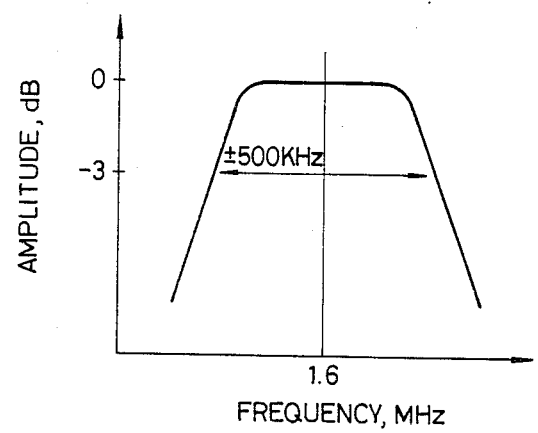
FIG. 6 is a drawing representing one example of a characteristic of a band pass filter used in the embodiment of the invention.

Further, for minimizing interference with a chrominance signal and a luminance signal of the video signal, a signal band will be limited through BPF 56 and 41 at the time of recording and reproducing. One example of BPF is shown in FIG. 6. Thus, the carrier frequency and the central frequency of BPF 56, 41 are made to coincide with each other, and the band width is limited, thereby minimizing an interference of the quadrature differential PSK signal with the video signal.

Next, a system for recording and reproducing a signal modulated with PCM audio signal on the same video track or parallel therewith by a magnetic head different in azimuth from the magnetic head for recording and reproducing FM luminance signal and down converted chrominance signal will be described as another embodiment.

Figure 7:
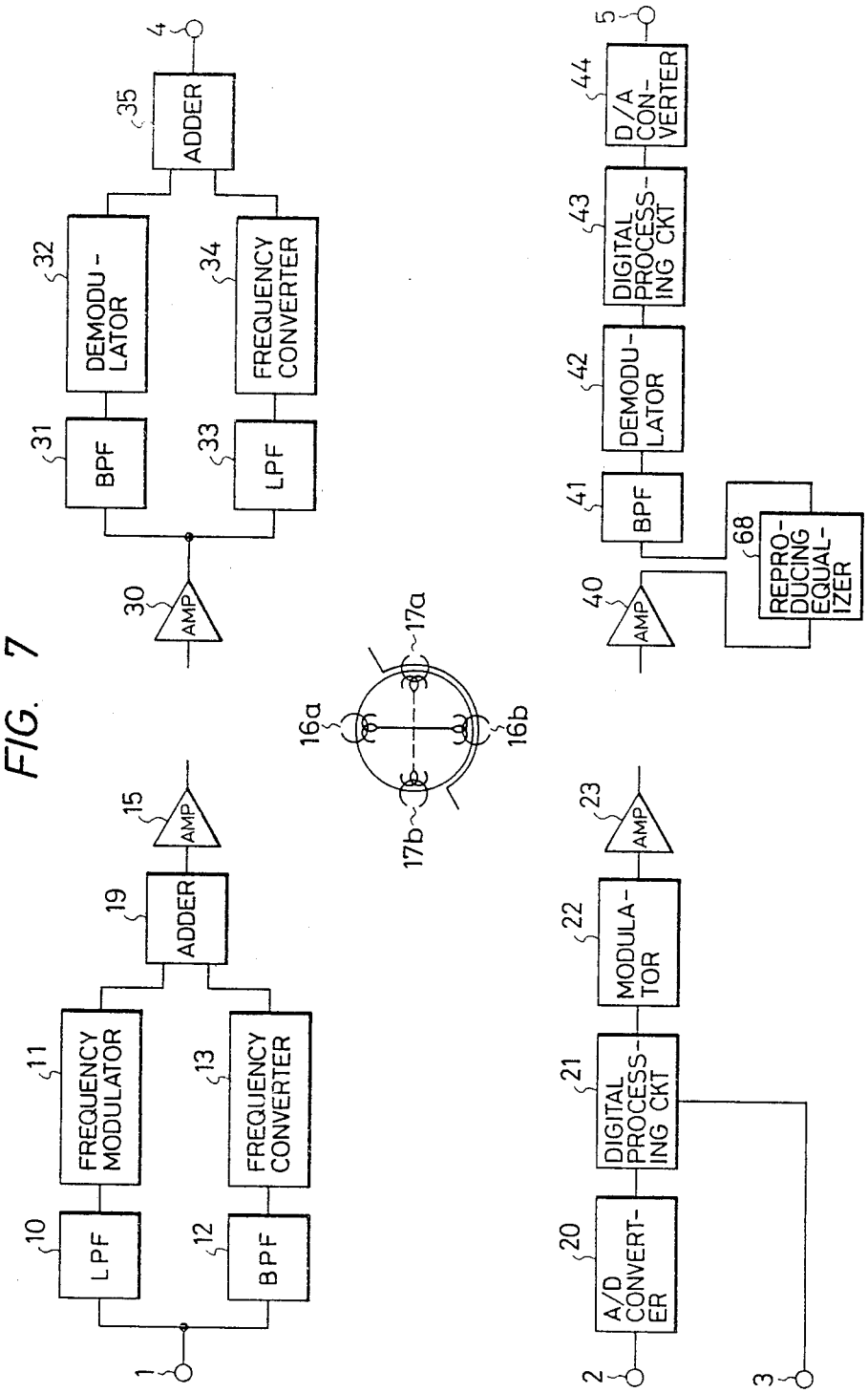
FIG. 7 is a block diagram representing a second embodiment of this invention.

The description is then given with reference to FIG. 7. In FIG. 7, 16a, 16b denote heads (video heads) exclusive for recording and reproducing FM luminance signal and down converted chrominance signal, 17a, 17b denote heads (audio heads) exclusive for recording and reproducing audio signals, 19 denotes an adder for combining a luminance signal and a chrominance signal, 23 denotes a recording amplifier, 40 denotes a reproducing amplifier, and 68 denotes a reproducing equalizer. Other reference numerals same as FIG. 1 represent blocks and parts identical in function to those of FIG. 1. The audio signal (a signal subjected to quadrature differential PSK modulation with PCM audio signal) is recorded on a video signal recording track or parallel therewith by the audio heads 17a, 17b having an azimuth ±30°, for example, which are different from the video heads 16a, 16b, ±6° for example, in azimuth, operating for recording and reproducing of FM luminance signal and down converted chrominance signal. That is, the audio recording signal is recorded on an inner layer of the magnetic tape leadingly of the video recording signal. Then consecutively, the video recording signals (FM luminance signal and down converted chrominance signal) are recorded by the video heads 16a, 16b in superposition on the audio recording signal recorded in advance. While the audio recording signal is recorded in a deep portion of the magnetic tape, the video recording signal is recorded in a surface portion of the magnetic tape.

Figure 8:
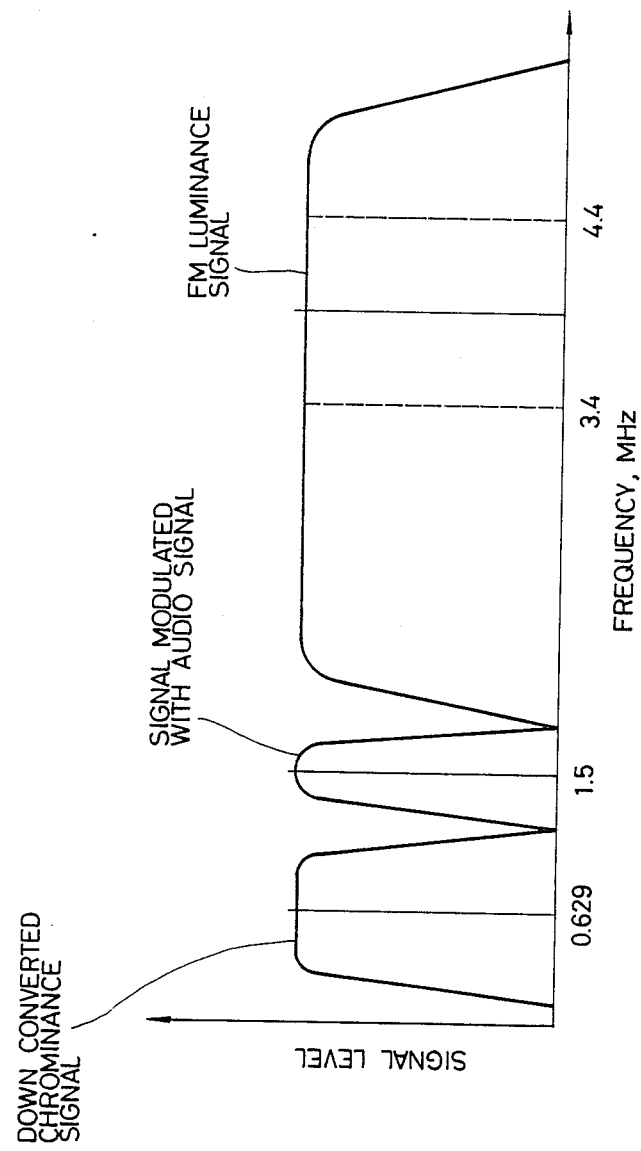
FIG. 8 is a drawing representing another example of the spectrum of recording signals.

Here, as shown in FIG. 8, an occupied band for recording the audio signal is disposed outside occupied bands of FM luminance signal and down converted chrominance signal or in a clearance between both the two, and the video heads 16a, 16b and the audio heads 17a, 17b which are different in azimuth each other are used, thereby minimizing a mutual interference of the video signal and the audio signal.

Figure 9:
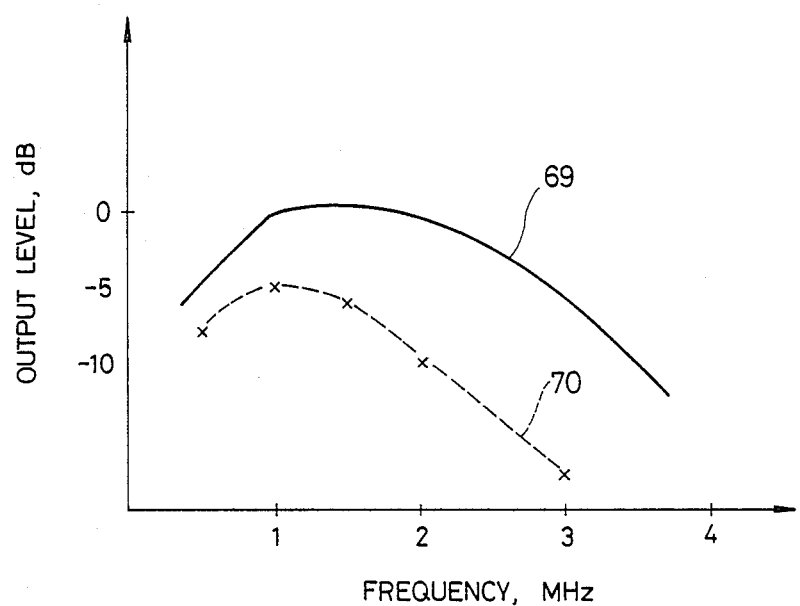
FIG. 9 is a drawing representing a frequency characteristics of an audio recording signal at the time of recording and reproducing.

Here, in case, for example, a data of 12 GHz band satellite broadcasting PCM audio format is recorded on the quadrature differential PSK modulation system, a spectrum band of the audio signal at the time of recording on a tape will be 1 to 2 MHz from selecting a carrier frequency of the audio signal at 1.5 MHz or so.

Where FM luminance signal and down converted chrominance signal are recorded in superposition on the audio signal like the embodiment, a reproducing output level of the audio recording signal recorded on a deep layer leadingly causes generally a deterioration of frequency characteristic according to a superficial erasing effect by the superposed recording. FIG. 9 shows a result obtained through measuring a frequency characteristic of the signal modulated with PCM audio signal in superposed recording. In FIG. 9, 69 denotes a frequency characteristic at the time of deep layer recording, and 70 denotes a frequency characteristic after superposed recording. To demodulate correctly the signal modulated with PCM audio signal, it is necessary that a deterioration of the frequency characteristics due to the superposed recording, namely a deterioration by the ratio of the output 70 to the output 69 be compensated in optimum conditions. In the embodiment given in FIG. 7, the equalizer 68 is provided for compensating the deterioration at the time of reproducing.

Figure 10:
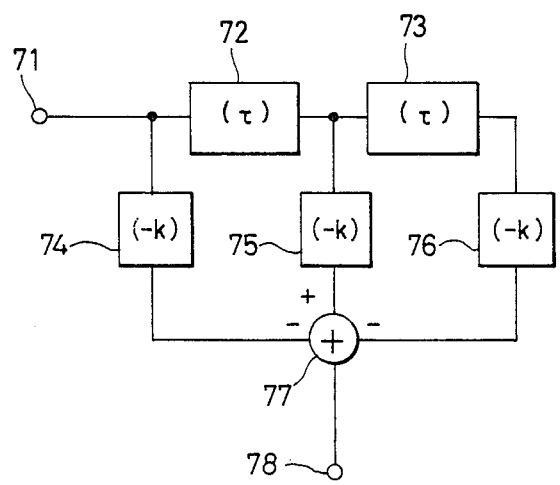
FIG. 10 is a block diagram representing one example of a reproducing equalizer used in the embodiment of the invention.

FIG. 10 represents one mode of operation of the reproducing equalizer 68. The circuit is a type called "transversal filter". A reference numeral 71 denotes an input terminal of the reproducing equalizer 68, the input signal and outputs of delay elements 72, 73 being $\tau$ in delay time each are inputted to coefficient circuits 74, 75, 76 wherein an amplitude of the inputted signal is multiplied by a coefficient ($-k$) each, and added through an adder 77, thereby correcting the deterioration of the above-mentioned frequency characteristics and obtaining an output 78.

Figure 11:
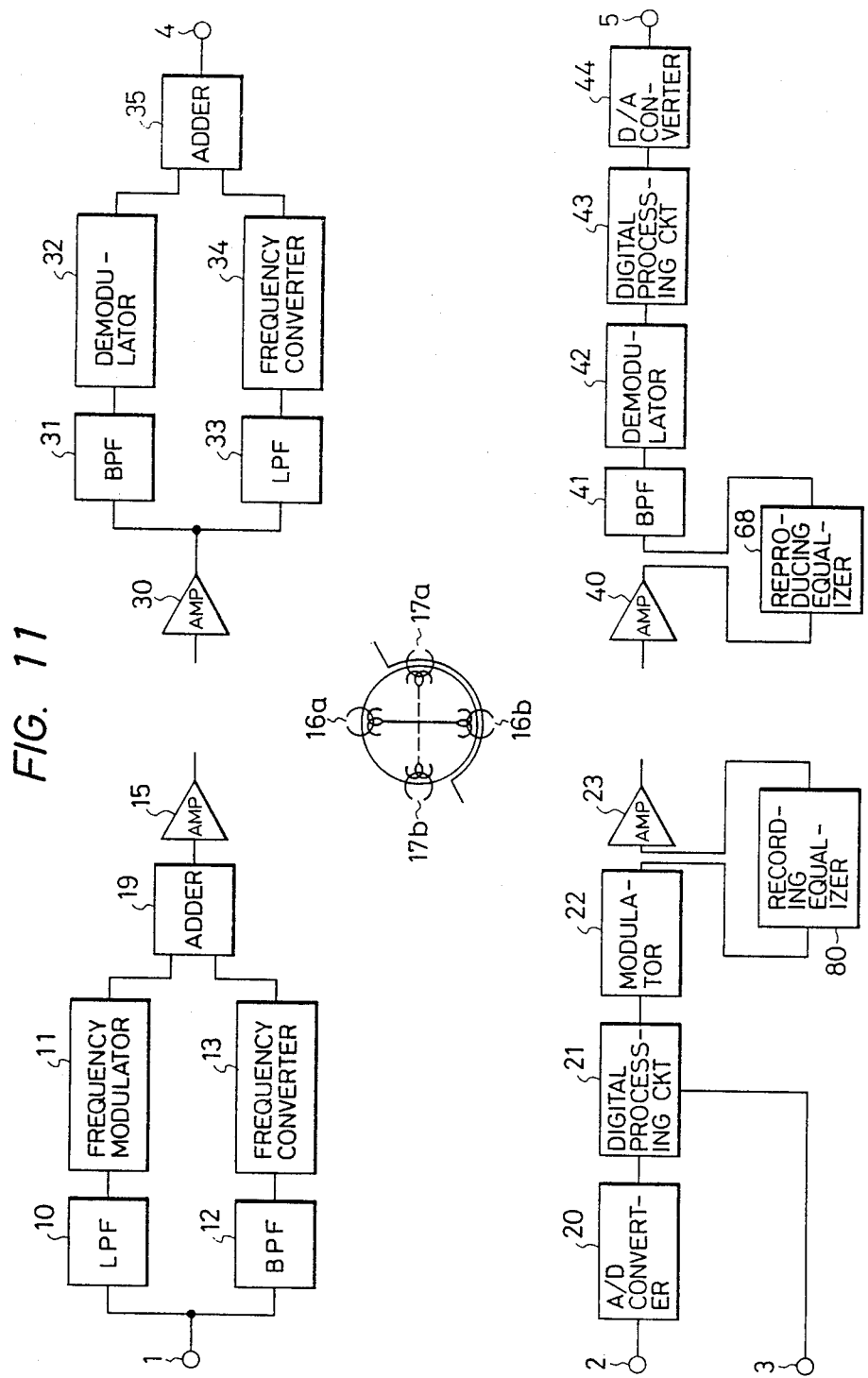
FIG. 11 is a block diagram representing a third embodiment of this invention.

FIG. 11 represents another embodiment of the invention. In the embodiment, a signal-to-noise ratio at the time of reproducing and a peak shift due to an interference among codes will be corrected by equalizing waveforms chiefly at the time of recording.

Figure 12:
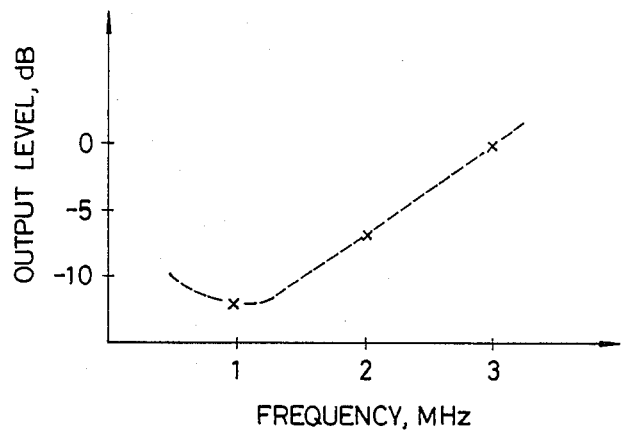
FIG. 12 is a drawing representing a frequency characteristic of a recording equalizer used in the embodiment of the invention.

In the embodiment of FIG. 11, a recording equalizer 80 is provided. Parts other than that are equivalent to those of FIG. 7, and the same reference characters as FIG. 7 represent blocks or parts identical in function to those of FIG. 7. One example of a characteristic of the recording equalizer 80 is shown in FIG. 12. The characteristic is that of correcting a deterioration of the high component shown in the frequency characteristic 70 after superposed recording shown in FIG. 9.

Thus high frequency components of the signal modulated with PCM audio signal is raised beforehand by the recording equalizer 80. The signal with the high frequency zone corrected as above is recorded on a deep layer of the magnetic tape on the video signal recording track or parallel therewith by the audio heads 17a, 17b. Next, FM luminance signal and down converted chrominance signal are recorded by the video heads 16a, 16b in superposition on the audio signal recorded leadingly.

Signals reproduced by the audio heads 17a, 17b are equalized by the reproducing equalizer 68 at the time of reproducing, demodulated then to an original PCM audio signal by the digital processing circuit 43 through BPF 41, demodulator 42, and further converted into an original analog audio signal through D/A converter 44.

Here, equalization at the time of recording may be advantaged in two points. One is that when equalized on a reproducing side, the high component is raised to emphasize a noise component similarly, which deteriorates the signal-to-noise ratio. However, when equalized on a recording side, a raise of the reproducing equalizer 68 is minimized, which is advantageous in the aspect of signal-to-noise ratio.

Further in a magnetic recording, there is a phenomenon called peak shift that an inversion interval at the time of reproducing is expanded more than that at the time of recording. (A detail is given in "Magnetic Recording" by Mitsunori Matsumoto, KYORITSU SHUPPAN, at 7.5 Reproducing of Digital Signals, Chapter 7: Reproducing Process.) From raising a high frequency zone at the time of recording, a change point of the recording signal is further emphasized, and thus the peak shift can be corrected reasonably.

As described above, a deterioration of signal-to-noise ratio at the time of reproducing is minimized from equalizing waveforms, and a data can be demodulated more correctly from correcting the peak shift.

As described, the embodiment of the invention refers to the case where the video signal recording system works on FM luminance signal and down converted chrominance signal, however, an effect will be ensured from applying to the case where the video signal recording system covers a luminance and chrominance time base multiplex recording, and an occupied band width of the digital audio recording signal is multiplexed on a lower side of the occupied band of the video recording signal.

In the embodiments given in FIG. 7 and FIG. 11, first the audio recording signal (a signal modulated with PCM audio signal) is recorded by the audio head, and then the video recording signals (FM luminance signal and down converted chrominance signal) are recorded by the video heads. From recording in such order, the audio signal recorded on a surface layer portion of the magnetic tape is erased, and the video recording signals are recorded on the surface portion. With reference to a recorded state on the magnetic tape, a relation between wave length and recorded depth of a signal to be recorded is illustrated in FIG. 2 of a report titled "An Analysis of the Recording Characterstics in Short Wavelength" by Sango Muramatsu, MR75-28, Society for Study of Magnetic Recording, Institute of Electronics and Communication Engineers of Japan. The lower the frequency of a signal recorded second is or the larger a recording current of the signal is, the larger a degree of the outer layer erasing becomes.

Figure 13:
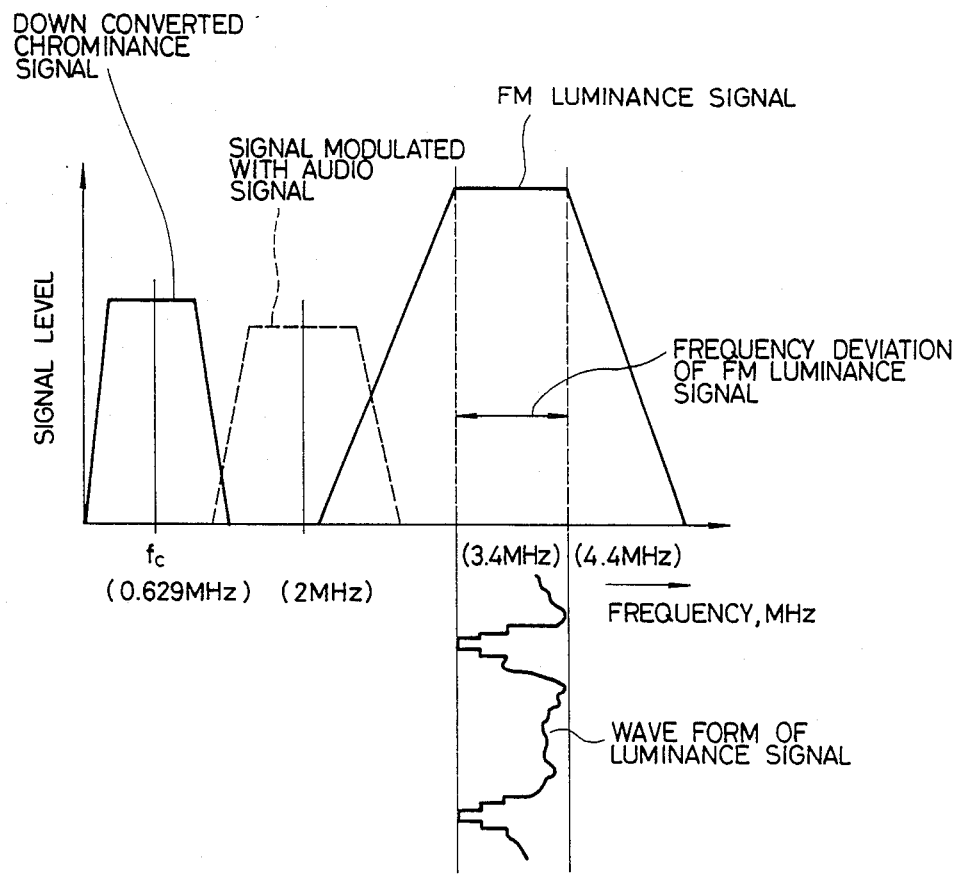
FIG. 13 is a drawing representing a further example of the spectrum of recording signals.

Here, FM luminance signal in the video signals is that for which a carrier is subjected to frequency modulation with the luminance signal, the carrier becomes lowest in frequency at a synchronizing signal portion of the luminance signal, and is modulated to be higher in frequency according as a luminance gets bright. One example of a frequency spectrum of such recording signal is shown in FIG. 13. Further, the recording current has a frequency characteristic from the characteristic of recording heads, and has a value greater according as the frequency is low.

Accordingly, when recorded on an apparatus of such example, a reproducing signal of the signal modulated with PCM audio signal will be subjected to amplitude modulation by FM luminance signal. That is, since an erasing effect at the synchronizing signal portion is large in FM luminance signal, it is subjected to amplitude modulation according to the synchronizing signal.

Figure 14:
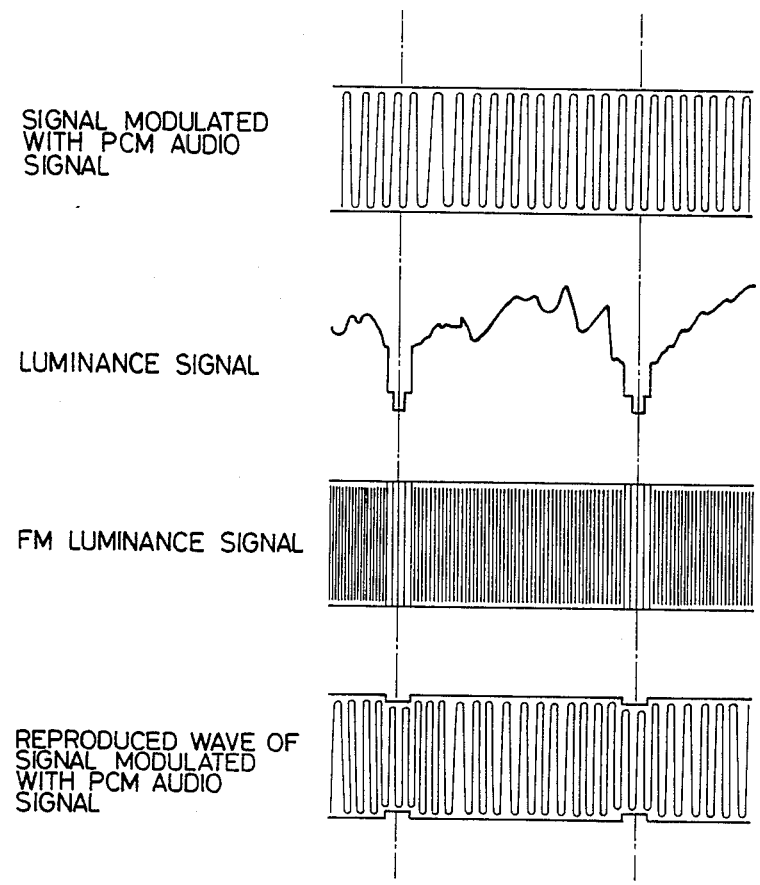
FIG. 14 is a waveform drawing of a recording signal and the reproducing signal.

A waveform of the reproducing signal of a signal modulated with PCM audio signal which is subjected to amplitude modulation by FM luminance signal is as shown in FIG. 14. On the other hand, a recording current frequency characteristic of the head for recording FM luminance signal is indicated by a full line of FIG. 15.

Here, FM luminance signal is a carrier subjected to frequency modulation with the luminance signal, and is also a wave modulated so that a tip portion of the synchronizing signal will work, for example, at 3.4 MHz as shown in FIG. 13. Accordingly, from FIG. 13 and FIG. 15, a synchronizing signal portion in FM luminance signal is low in frequency and the recording current is large, therefore the signal modulated with PCM audio signal is erased heavily in degree in the synchronizing signal portion.

According to the present invention, to decrease such erased degree by the synchronizing signal portion, a frequency characteristic of the recording current of FM luminance signal will be changed and flattened for example. For example, a characteristic indicated by a broken line in FIG. 15 will be obtained.

Figure 16:
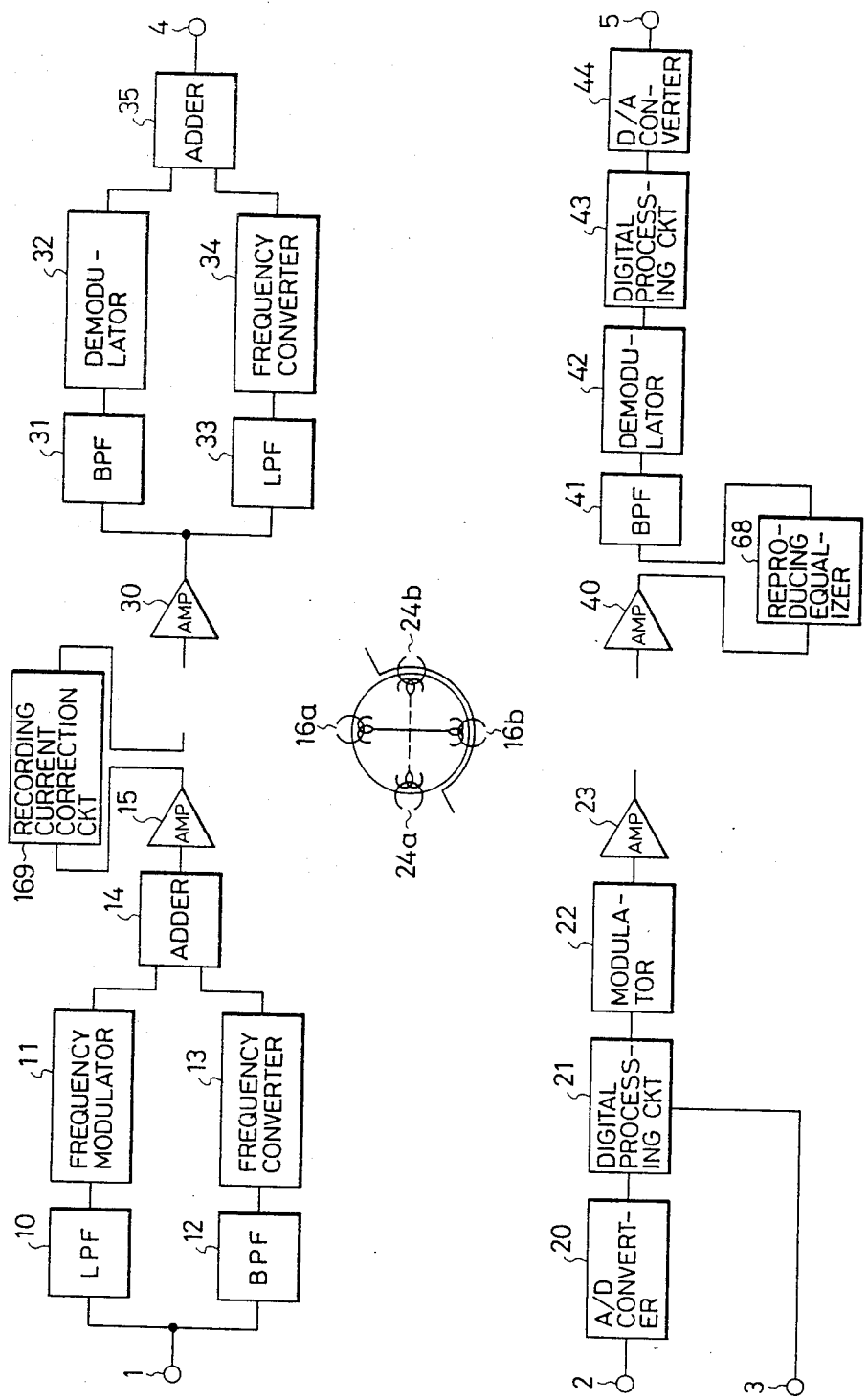
FIG. 16 is a block diagram representing a fourth embodiment of this invention.

FIG. 16 represents such embodiment of the present invention. In the embodiment, a recording current correction circuit 169 for correcting a frequency characteristic of a recording current of the video signal is provided to decrease a disturbance the video signal may exert on the audio signal. Parts other than that are equivalent to those of FIG. 7, and the reference characters same as FIG. 7 represent blocks or parts identical in function with those of FIG. 7.

The video signal is separated into a luminance signal and a chrominance signal through LPF 10 and BPF 12, which are then made to FM luminance signal and down converted chrominance signal respectively on the frequency modulator 11 and the frequency converter 13. The two signals are combined on the adder 14, the added signal is corrected on the recording current correcting circuit 169 through the recording amplifier 15 and then recorded on a magnetic tape by the two opposite video signal recording and reproducing heads 16a, 16b, ±6° for example in azimuth. Such video recording signals are recorded in superposition on a recording of a signal subjected to a quadrature differential PSK modulation by PCM audio signal, recorded by audio heads 24a and 24b. Frequency bands of the video and audio recording signals are shown in FIG. 13.

Figure 15:
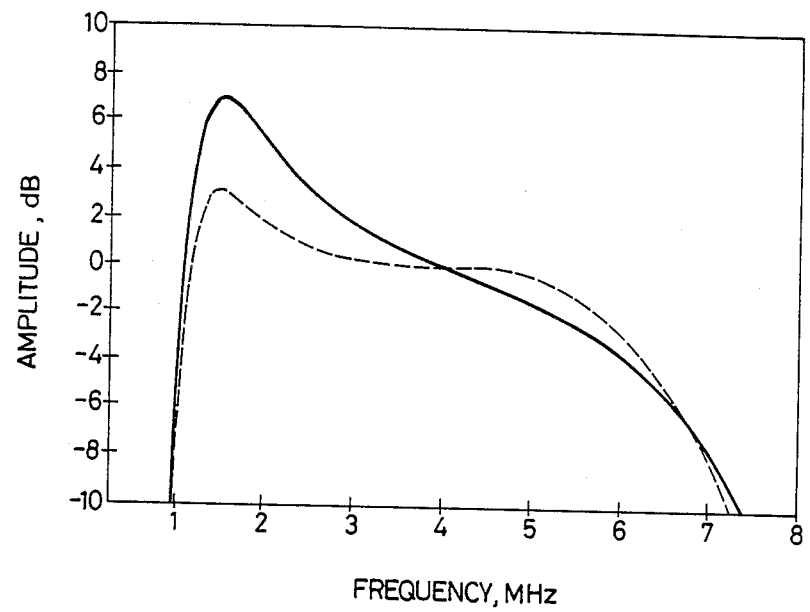
FIG. 15 is a drawing representing a frequency characteristic of a recording current of a video recording signal.

The recording current correction circuit 169 changes and flattens a frequency characteristic of a recording current of the video signal as indicated by a broken line in FIG. 15. The characteristic is that of correcting the recording current so that the recording current of a frequency corresponding to a tip portion of the synchronizing signal and the recording current of a frequency corresponding to a white peak of the luminance signal will be same in size. One example of the correction circuit having such characteristic is shown in FIG. 17.

Figure 17:
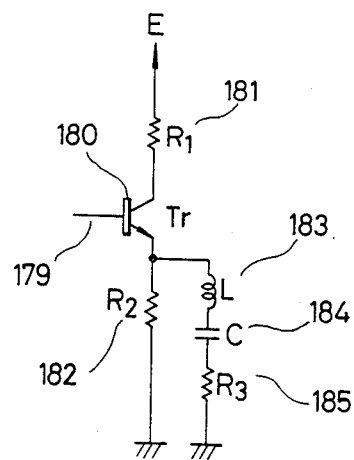
FIG. 17 is a circuit diagram representing one example of a recording current correction circuit used in the embodiment of the invention.

In FIG. 17, 179 denotes an input signal line, 180 denotes a transistor, 181, 182, 185 denote resistors, 183 denotes a coil, 184 denotes a capacitor, and the recording current frequency characteristic is corrected by a resonance characterstic determined on a resonance frequency determined by the coil 183 and the capacitor 184 and the resistor 185.

Figure 18A:
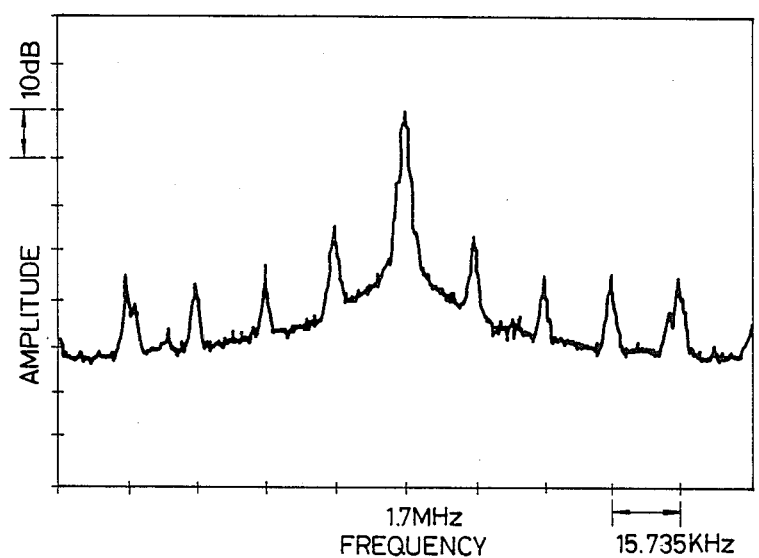
FIG. 18A, FIG. 18B and FIG. 19 are drawings representing a spectrum of the reproducing signal of the audio recording signal each.
Figure 18B:
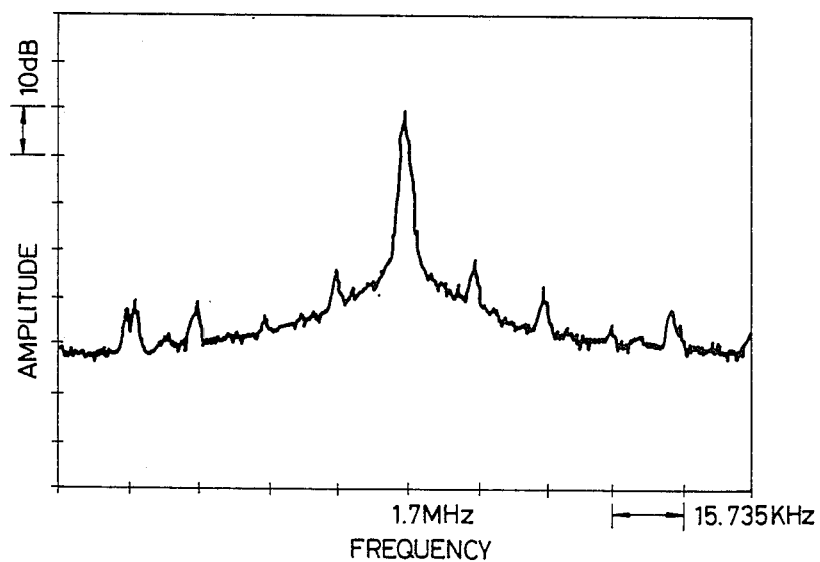
Figure 19:
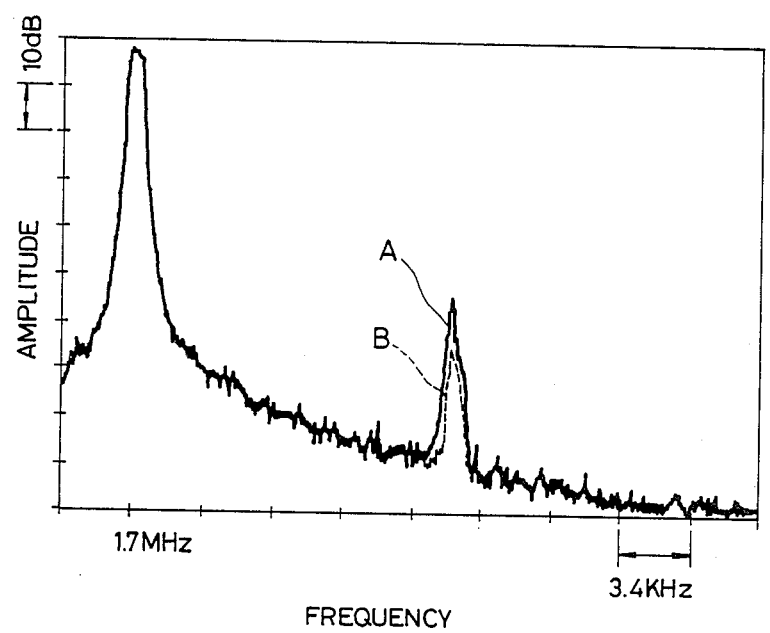

FIG. 18A, FIG. 18B and FIG. 19 show the effect. That is, it represents a frequency spectrum of the reproducing signal by the audio head when a 1.7 MHz signal is recorded by the audio head and then the video recording signals are recorded in superposition thereon by the video heads. FIG. 19 shows only a portion 1.70 to 1.73 MHz in frequency.

Here, FIG. 18A and a curve A of FIG. 19 represent frequency spectra of the 1.7 MHz signal when FM luminance signal is recorded with the characteristic in full line of FIG. 15. Then, FIG. 18B and a dotted line curve B of FIG. 19 represent frequency spectra of the 1.7 MHz signal when FM luminance signal is recorded with the characterstic in broken line of FIG. 15.

As indicated by FIG. 18B and the curve B of FIG. 19, an amplitude of the amplitude modulated component caused by a synchronizing signal in the luminance signal can be decreased by about 5 dB according to the characteristic in broken line of FIG. 15. In the drawings, a peak appearing at intervals of 15.735 KHz (horizontal synchronizing frequency) is the amplitude modulated component (noise) caused by the synchronizing signal.

Next, in case the audio recording signal is recorded simultaneously with the video recording signal in frequency division multiplex thereon, since the audio recording signal is recorded with a video recording signal current working as bias current, a reproducing output of the audio recording signal is subjected to a change by a frequency and a recording current of the video recording signal.

Generally, a frequency of the frequency modulated carrier corresponding to a tip portion of the synchronizing signal in the video signal is low to be overbias, therefore the reproducing output of the audio recording signal deteriorates. For compensation, a video recording signal current correction circuit is inserted in the video recording signal system as in the case of above-mentioned embodiment.

According to the above embodiment, a PCM audio signal or a digital data can be recorded in multiplex on the video signal with less disturbance of the video signal, and thus a high quality audio signal or digital data will be obtainable.

As described above, a reproduced waveform of the signal modulated with PCM audio signal is subjected to an amplitude modulation by the synchronizing signal in FM luminance signal, and the amplitude modulated component exerts a disturbance on a demodulation of the reproduced wave. According to the invention, the disturbance can be reduced by limiting an amplitude of the reproduced wave.

FIG. 20 represents such embodiment. In the embodiment, a limiter 87 is provided. Parts other than that are equivalent to those of FIG. 7, and the reference characters same as FIG. 7 represent blocks or parts identical in function to those of FIG. 7. In the embodiment, a disturbance to be exerted on the audio signal by the video signal can be reduced by applying an amplitude limiting on an output signal of the reproducing equalizer 68 through the limiter 87.

Figures 21A, 21B:
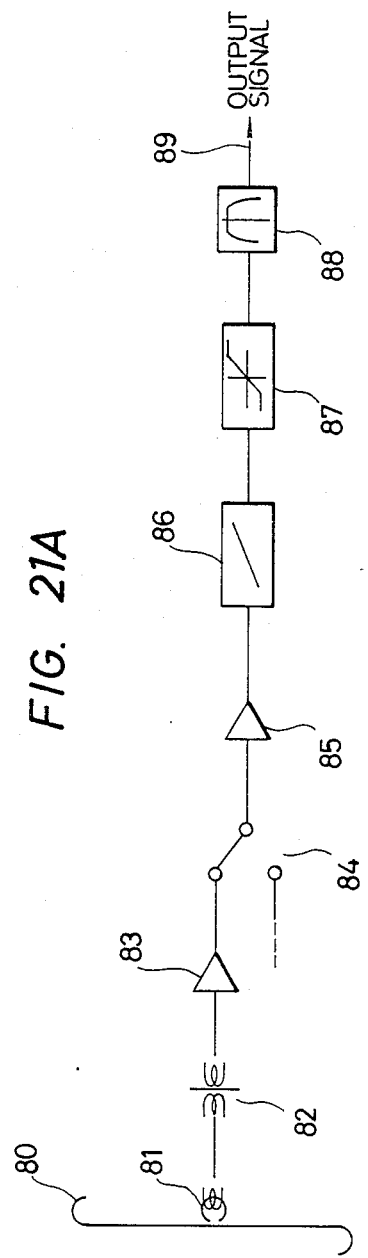
FIG. 21A and FIG. 21B are block diagrams representing a reproducing circuit system of audio recording signals each.
Figure 22A:
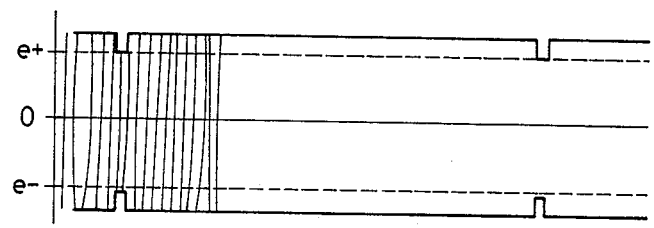
FIG. 22A, and FIG. 22B are waveform drawings of the reproducing signal of the audio recording signal each.
Figure 22B:
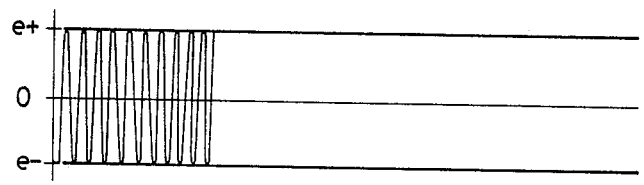

FIG. 21A and FIG. 21B represent an example of a reproducing circuit configuration including the limiter, and FIG. 22A and FIG. 22B are input and output waveform drawings of the circuit. An amplitude fluctuation can thus be decreased.

FIG. 21A represents the case where the limiter 87 is disposed after an equalizer 86, and FIG. 21B represents the case where the limiter 87 is disposed before the equalizer 86 or the equalizer 86 is not disposed.

A signal of those which are recorded on the tape 80 which is modulated with PCM audio signal is reproduced by a head 81 and limited by the limiter 87 by way of a rotary transformer 82, a preamplifier 83, an analog switch 84, a buffer amplifier 85, and the equalizer 86. The limited signal is filtered through BPF 88, and a filter output signal 89 is inputted to PSK demodulator.

FIG. 22A and FIG. 22B are waveform drawings for illustrating an operation of the limiter 87. An amplitude modulated input signal (FIG. 22A) is limited by amplitude limiting levels $e_+$ and $e_-$. The limited waveform is shown in FIG. 22B.

Figure 23:
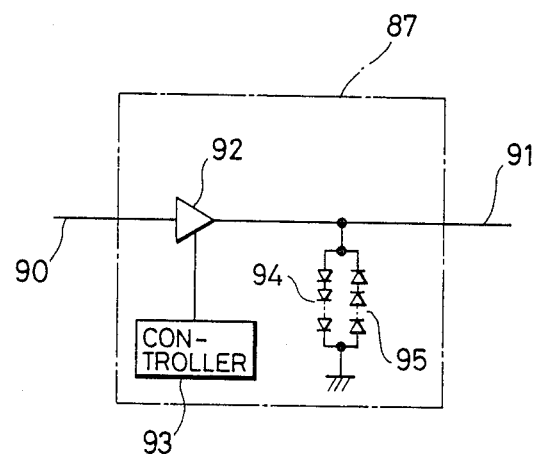
FIG. 23, FIG. 24 and FIG. 25 are circuit diagrams representing an example of an amplitude limiting circuit used in the embodiment of the invention each.

FIG. 23 represents a concrete mode of operation of the limiter 87:

A signal to be limited 90 is inputted to an amplifier 92 of the limiter 87. Here, an amplification degree of the amplifier 92 is controlled by an amplification degree controlling circuit 93. An amplitude is limited by a plurality of diodes 94 and 95. Here, the limited amplitude can be changed by controlling the amplification degree of the amplifier 92. A reference numeral 91 denotes an output of the limiter 87.

Figure 24:
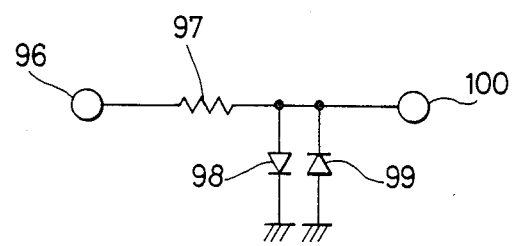
Figure 25:
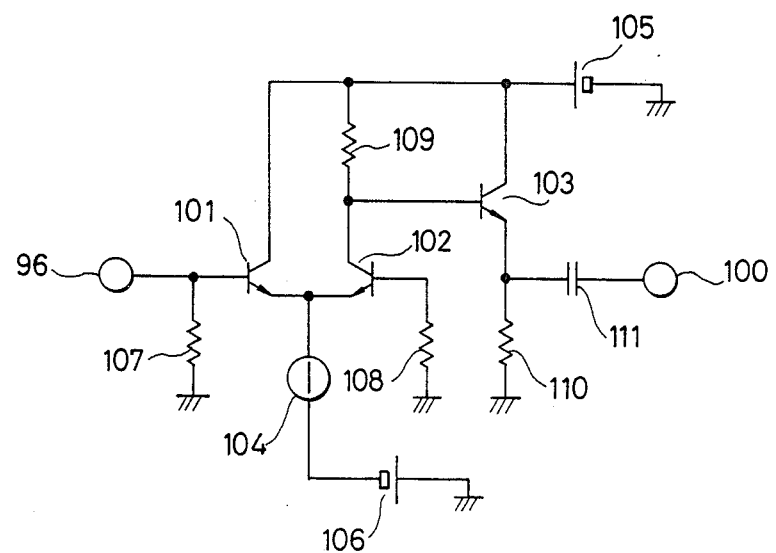

FIG. 24 is a circuit diagram representing another example of the limiter 87. In the drawing, a signal inputted to an input terminal 96 has the amplitude limited to a threshold voltage (about 0.7 V for example) for both positive and negative by a resistor 97 and diodes 98, 99 and is output from an output terminal 100. FIG. 25 is a circuit diagram representing a further example of the limiter 87, where a limiter effect of the differential amplifier constituted of transistors 101, 102 is used.

Thus, various circuit systems will be conceivable for the limiter 87, however, the invention is not necessarily limited to this circuit system.

Next, in case the audio recording signal is recorded simultaneously with the video recording signal in frequency division multiplex on the video recording signal, since the audio recording signal is recorded with a video recording signal current working as bias current, a reproducing output of the audio recording signal is subjected to change by a frequency and a recording current of the video recording signal.

Generally, a frequency of the frequency modulated carrier corresponding to a tip portion of the synchronizing signal in the video signal is low to be overbias, therefore the reproducing output of the audio recording signal deteriorates. For compensation. a reproducing signal limiter of the audio recording signal is inserted in the audio reproducing signal system as in the case of the above-mentioned embodiment.

According to the above embodiment, a PCM audio signal or a digital data can also be recorded in multiplex on the video signal with less disturbance of the video signal at the time of reproducing, and thus a high quality audio signal or digital data will be obtainable.

What is claimed is:

1. A recording and reproducing apparatus wherein a video signal and an information signal other than the video signal like an audio signal are recorded on the same track of a recording medium, said apparatus comprising:

first processing means for converting a video signal to be recorded into a video recording signal having a predetermined frequency band;

second processing means for converting an information signal to be recorded other than the video signal into a digital signal;

modulator means for modulating a carrier with the digital information signal;

first magnetic head means for recording an output signal of the modulator means in a deep layer of the recording medium along a recording track thereof prior to recording of the video recording signal along the recording track;

second magnetic head means for recording the video recording signal in a surface layer of the recording medium along the recording track and in superposition on the previously recorded output signal of the modulator means, the first and second magnetic head means being different in azimuth; and equalizer means for compensating an attenuation of high frequency components in the output signal of the modulator means due to an erasing effect caused by the superposition of the video recording signal thereon along the recording track.

2. A recording and reproducing apparatus according to claim 1, wherein said modulator means subjects the carrier to a quadrature differential PSK modulation with said digital information signal.

3. A recording and reproducing apparatus according to claim 1, further comprising a correction circuit for correcting a recording current of the video recording signal so as to restrain a recording current corresponding to a synchronizing signal portion of the video signal from growing larger than a recording current corresponding to the other portion of the video signal.

4. A recording and reproducing apparatus according to claim 1, further comprising limiter means for limting the amplitude of a signal reproduced from a recording of the output signal of said modulator means.

5. A recording and reproducing apparatus wherein a video signal and an information signal other than the video signal like an audio signal are recorded on the same track of a recording medium, said apparatus comprising:

first processing means for converting a video signal to be recorded into a video recording signal having a predetermined frequency band;

second processing means for converting an information signal to be recorded other than the video signal into a digital signal;

modulator means for modulating a carrier with the digital information signal so that the frequency band of a signal modulated with the digital information signal will be disposed outside an occupied band of the video recording signal or between occupied bands of a luminance signal component and an chrominance signal component of the video recording signal;

first magnetic head means for recording an output signal of the modulator means in a deep layer of the recording medium along a recording track thereof prior to recording of the video recording signal along the recording track;

second magnetic head means for recording the video recording signal in a surface layer of the recording medium along the recording track and in superposition on the previously recorded output signal of the modulator means, the first and second magnetic head means being different in azimuth; and equalizer means for compensating an attenuation of high frequency components in the output signal of the modulator means due to an erasing effect caused by the superposition of the video recording signal thereon along the recording track.

6. A recording and reproducing apparatus according to claim 5, wherein said modulator means subjects the carrier to a quadrature differential PSK modulation with said digital information signal.

7. A recording and reproducing apparatus according to claim 5, further comprising a correction circuit for correcting a recording current of the video recording signal so as to restrain a recording current corresponding to a synchronizing signal portion of the video signal from growing larger than a recording current corresponding to the other portion of the video signal.

8. A recording and reproducing apparatus according to claim 5, further comprising limiter means for limiting the amplitude of a signal reproduced from a recording of the output signal of said modulator means.

9. A recording and reproducing apparatus wherein a video signal and an information signal other than the video signal like an audio signal are recorded on the same track of a recording medium, said apparatus comprising:

first processing means for converting a video signal to be recorded into a video recording signal having a predetermined frequency band;

modulator means for modulating a carrier with the digital information signal so that the frequency band of a signal modulated with the digital information signal will be disposed outside an occupied band of a chrominance signal component of the video recording signal;

first magnetic head means for recording an output signal of the modulator means in a deep layer of the recording medium along a recording track thereof prior to recording of the video recording signal thereof along the recording track;

second magnetic head means for recording the video recording signal in a surface layer of the recording medium along the recording track and in superposition on the previously recorded output signal of the modulator means, the first and second magnetic head means being different in azimuth; and equalizer means for compensating an attenuation of high frequency components in the output signal of the modulator means due to an erasing effect caused by the superposition of the video recording signal thereon along the recording track.

10. A recording and reproducing apparatus according to claim 9, wherein said modulator means subjects the carrier to a quadrature differential PSK modulation with said digital information signal.

11. A recording and reproducing apparatus according to claim 9, further comprising a correction circuit for correcting a recording current of the video recording signal so as to restrain a recording current corresponding to a synchronizing signal portion of the video signal from growing larger than a recording current corresponding to the other portion of the video signal.

12. A recording and reproducing apparatus according to claim 9, further comprising limiter means for limiting the amplitude of a signal reproduced from a recording of the output signal of said modulator means.

* * * * *